United States Patent [19]

Cairns

[11] Patent Number: 4,962,530
[45] Date of Patent: Oct. 9, 1990

[54] SYSTEM FOR CRYPTOGRAPHING AND IDENTIFICATION

[75] Inventor: John P. Cairns, Wilmington, Del.

[73] Assignee: Computer Security Corporation, Wilmington, Del.

[21] Appl. No.: 95,405

[22] Filed: Sep. 10, 1987

[51] Int. Cl.⁵ .............................................. G06F 3/02
[52] U.S. Cl. ........................................ 380/23; 380/9; 380/24; 380/52; 341/23; 341/175; 340/543; 340/712; 340/825.31; 340/825.34
[58] Field of Search ........................................ 380/3-5, 380/23-25, 49, 50, 52, 59, 9; 235/380, 382; 340/543, 712, 766-825.3, 825.31; 341/23, 175

[56] References Cited

U.S. PATENT DOCUMENTS

| | | | |
|---|---|---|---|
| 2,518,458 | 8/1950 | Friedman | 380/59 |
| 3,495,232 | 2/1970 | Wagner | 340/712 |
| 3,688,086 | 8/1972 | Levasseur | 235/380 |
| 3,823,308 | 7/1974 | Goldberg | 235/380 |
| 4,034,193 | 7/1977 | Jackson | 364/465 |
| 4,068,089 | 1/1978 | Kuhnlein et al. | 380/52 |
| 4,078,257 | 3/1978 | Bagley | 340/712 X |
| 4,158,433 | 6/1979 | Peterson et al. | 235/380 |
| 4,170,714 | 10/1979 | Branscome et al. | 380/9 |
| 4,184,148 | 1/1980 | Smagala-Romanoff | 340/825.34 |
| 4,224,615 | 9/1980 | Penz | 340/712 |
| 4,277,837 | 7/1981 | Stuckert | 235/380 |
| 4,280,121 | 7/1981 | Crask | 340/712 X |
| 4,290,061 | 9/1981 | Serrano | 340/712 |
| 4,333,090 | 6/1982 | Hirsch | 380/52 |
| 4,336,530 | 6/1982 | Koike et al. | 340/712 X |
| 4,454,414 | 6/1984 | Benton | 235/380 X |
| 4,479,112 | 10/1984 | Hirsch | 380/52 |
| 4,484,179 | 11/1984 | Kasday | 340/712 |
| 4,502,048 | 2/1985 | Rehm | 340/825.31 |
| 4,523,087 | 6/1985 | Benton | 235/380 X |
| 4,529,870 | 7/1985 | Chaum | 235/380 |
| 4,558,175 | 12/1985 | Genest et al. | 380/23 X |
| 4,614,861 | 9/1986 | Pavlov et al. | 235/380 |
| 4,642,627 | 2/1987 | Hodsdon | 340/712 X |
| 4,644,326 | 2/1987 | Villalobos et al. | 340/712 X |
| 4,667,087 | 5/1987 | Quintana | 235/380 |
| 4,689,478 | 8/1987 | Hale et al. | 235/380 |
| 4,705,211 | 11/1987 | Honda et al. | 235/380 |
| 4,707,594 | 11/1987 | Roth | 235/380 X |
| 4,749,982 | 6/1988 | Rikuna et al. | 235/380 X |
| 4,766,293 | 8/1988 | Boston | 235/380 X |

FOREIGN PATENT DOCUMENTS

0147837 7/1985 European Pat. Off. .
2186101 8/1987 United Kingdom .

Primary Examiner—Stephen C. Buczinski
Assistant Examiner—Bernarr Earl Gregory

[57] ABSTRACT

According to the invention, the keyboard consists of a matrix of keys and variable visible indicia. Each of the variable visible indicia is associated with a key. Upon each keystroke on the keyboard, the system randomly changes the positions of all of the indicia on the matrix. Because the true value of any particular key is independent of the value displayed on the variable visible indicia, a casual observer can not learn the keystrokes being entered into the keyboard. If the code entered at the keyboard matches a stored value, the user is granted access.

11 Claims, 11 Drawing Sheets

| | Character Requirement By Authentication Code | Authentication Character As It Appears Displayed | Comparison BCD To EPROM |
|---|---|---|---|
| First | Numeral 3 In Matrix Position A1 | ᗱ | 0011 |
| Second | Any Character In Position B2 | Any Of The Operative Letters Or Numerals 0-9 | BCD From Position B2 |
| Third | Character B In One Of The Matrix Positions | ᗷ | 01011 |
| Fourth | Character 6 In One Of The Matrix Positions | ᑲ | 0110 |

SYSTEM FOR CRYPTOGRAPHING AND IDENTIFICATION

This invention relates to a cryptographic system capable of operating to enter coded characters into a method and apparatus for the comparisons of values of characters.

This invention relates to a security system for controlling access to secured areas and to computer terminals and similar subjects to which access is restricted. The invention relates in particular to access control systems in which data is entered in an access control system by selective actuation of a data input keyboard and manual generation of digital data in the form of electronic signals.

BACKGROUND OF THE INVENTION

For security protection of subjects to which restriction of access is desirable, a major requirement is individual accountability of persons gaining such access. User identification and authentication are prime requirements in effecting this individual accountability.

A password-based user authentication mechanism, with the password being kept secret at all times has advantages over key cards.

It is desirable to have a user when seeking access to a restricted subject to use a keyboard and generate the electronic signals that authenticate the user and result in access. The disadvantage to such manual operation of a selective sequence of keys on the keyboard is its vulnerability to detection by mere observation.

A keyboard is defined as a plane which is partitioned into M*N elements where "M" is the number of rows and "N" is the number of columns.

In a specific embodiment herein these M*N elements consist of a push button and an 8 segment light emitting diodes or liquid crystal display, and represented by Kij in the expression, matrix position coefficient.

It is an object to preserve the confidentiality of the process of entering the data by actuation of a keyboard, and preventing an observer from detecting the access code by watching a user operate the keyboard and by displaying the character in an apparent random but in fact predetermined arrangement a distraction factor is introduced.

The object of the invention is means for entering a code of characters into a system for identification and authentication which performs a comparison by a procedure which so enciphers the coded information as it is entered into the system and displayed on a keyboard as to prevent disclosure of the code by observation of the keyboard display.

DEFINITIONS

The following are definitions of terms as used herein;

data bus—a system for moving data by a group of wires forming a common bus.

comparator—a unit that compares two binary numbers telling whether the numbers are equal, one-greater-than-the-other or visa-versa.

binary coded decimal—a representation of an alphanumeric character converted into a string of 1's or zeroes or in a binary code which for description purposes here are in four bit groups.

counter—a special kind of register made up of flip-flop circuits with one input and usually a output from each flip-flip, which counts pulses arriving at the input and stores the total count in a certain code (usually binary numbers).

clock input—an input terminal on a unit typically used for receiving a timing control-clock signal, but used in some applications for a control signal or even data.

programmable—a circuit which can be set with a fixed program.

matrix—a rectangular array of elements within a perimeter and comprised of positions arranged in rows and columns.

cycle—an interval of space or time in which one set of events or phenomena is completed.

character—an electronic signal formed by the system for representation of information, and including integers and letters.

code—a set of meanings assigned to groups of bits made up of binary representations or binary states provided by a sequence of high and low voltage areas.

exclusive-OR gate—a device with two inputs of binary digital information and one output, whose output is 1 when either input is 1 but is 0 if neither or both outputs are 1.

byte—a sequence of adjacent binary digits operated as a unit.

character string—a group of characters forming a code or password.

alphabet—a set of symbols or signals that serve as equivalents of letters. In the present embodiment the alphabet consists of integers, letters and matrix coefficients.

variable visible indicia—letters and integers appearing on suitable display means, such as light emitting diodes (LEDs), liquid crystal lights, nixie and gaseous discharge tubes.

symbol—a letter, integer or matrix coefficient.

password—a string of symbols of letters, integers or matrix coefficients having a length defined by a beginning and an end.

• matrix position coefficient—a coordinate position within the matrix defined by row and column and symbolized by Kij (specific row and column). IN the present invention it is a factor in a password which is the position in the matrix of variable visible indicia as established by row and column at a given symbol of the string of symbols making up the password length, herein after referred to as matrix coefficient.

display cycle—the time intervals making up the logging in by a log-in user of a symbol.

BRIEF DESCRIPTION OF THE INVENTION

According to this invention a keyboard is provided in a system which operates to detect the correct code (hereinafter referred to as password), which is entered into the system by actuating keys on the keyboard. The keyboard consists of a matrix of keys and variable visible indicia of integers and letters. The matrix is a rectangular array of keys and the variable visible indicia are shown on display means, such as LEDs, associated with the respective keys. In this invention the symbols appearing on the LEDs in the matrix are subjects of the code alphabet from which the string of symbols for the password is selected. Thus, in this invention a string making up the password is made up of matrix coefficients as well as binary digits representing integers and letters.

In accordance with this invention a system for password-based user identification impacts the characters and matrix coefficients making up the alphabet from which the string of symbols for the password are selected. Herein the password as used herein is a string of symbols used to authenticate an identity, particularly the identity of a user seeking to obtain access to a restricted subject by logging in the password.

The present invention departs from the previously disclosed art by increasing the alphabet so as to include the matrix coefficients.

In the specific embodiment set forth in the detailed description below the alphabet referred to consists of 26 letters, 10 integers and nine matrix coefficients.

The matrix is a display panel which in the described embodiment is made up of 9 matrix locations represented by LED's. The integers and letters, referred to as characters, appearing on the LED's change with each display cycle which accompanies the logging-in of a symbol for purposes of identification and authentication. A read-only-memory associated with the matrix provides the configuration of characters placed on the matrix with each display cycle. The matrix and its associated ROM are included in an encryption device in the system of this invention. This cryptographing ROM is programmed to provide to the matrix in predetermined manner the display changes correlated with logging in successively password symbols. The ROM is programmed to respond in a predetermined manner to provide these characters in the successive display cycles. The display on the face of the matrix is generated by the program in the encryption ROM. A key feature is that by changing the characters displayed at a specific matrix location within the display adds to the desired confusion level.

Each time the cryptographing ROM displays the character, the log-in user effects the entry of a symbol by actuating a switch, such as a button.

The selected symbol is introduced into a microprocessor. The microprocessor is under the control of a program in a ROM associated with the microprocessor. The microprocessor looks for a symbol by looking for a change of character at certain position at the time of logging in the relevant symbol in the string. Accordingly, this ROM can detect either a character or a matrix coefficient as a symbol, as explained in the following detailed description, the program loaded in the ROM provides the processing of authentication of the externally introduced characters. This program processes the alphabet characters introduced from the cryptograph into the microprocessor to compare the externally introduced characters by the authenticating program in the ROM.

DETAILED DESCRIPTION

Figure 1:
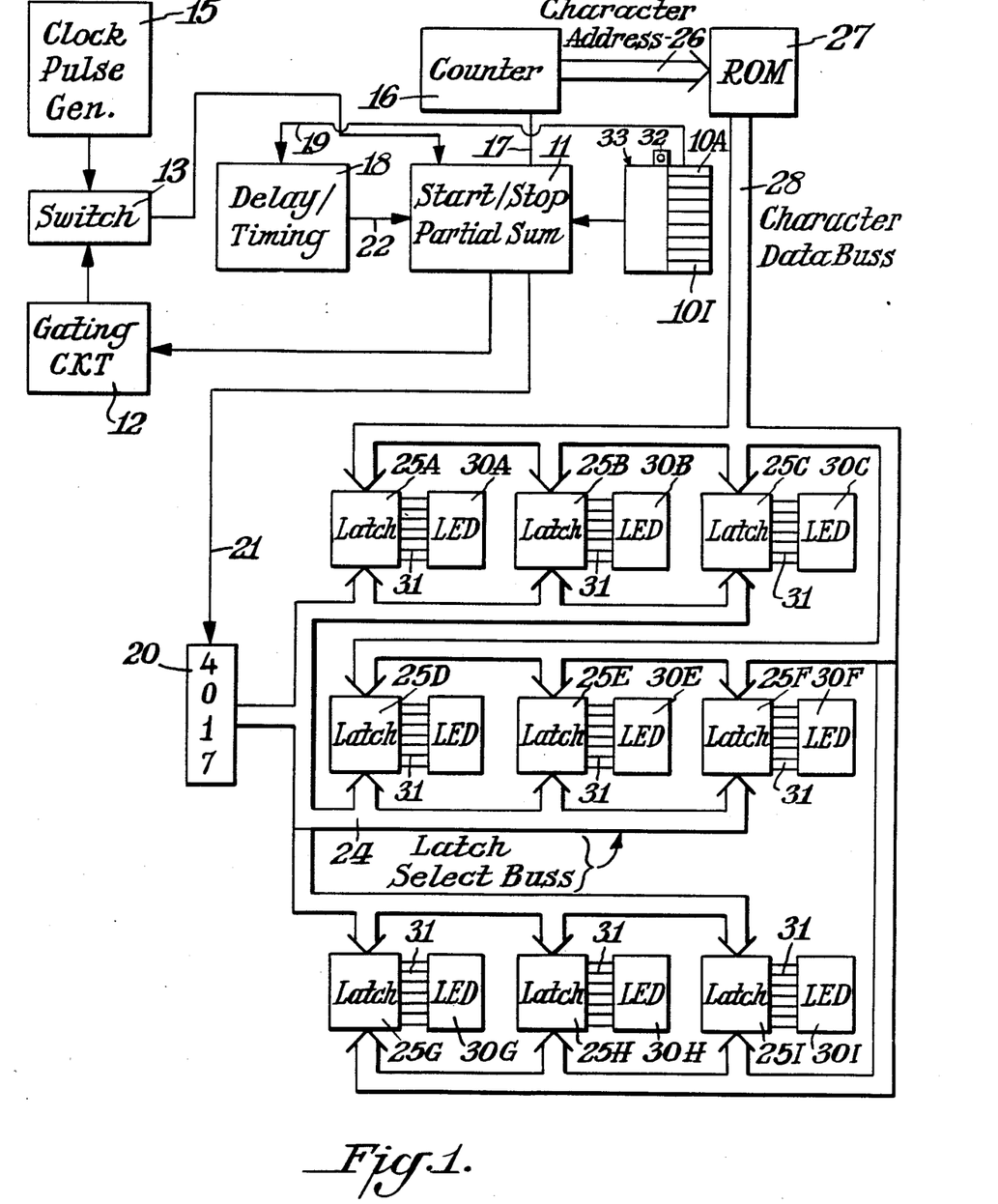
FIG. 1 is a block diagram of a cryptograph according to this invention.

FIG. 1 illustrates a system according to this invention. The system is turned on by actuating a reset button 32. The input of a character into the system is initiated by one of nine buttons 10A–I represented by nine contact switches 10A–I in FIG. 1. These buttons in the present embodiment are on a display panel or keyboard matrix 33 illustrated in greater detail in FIG. 4 and described below. The triggering of the button 32 results in nine figures appearing in nine various LEDs 30A–I, described below in FIG. 4. Then one of the buttons 10A–I is depressed and a symbol is logged in. This produces nine pulses from a start-stop circuit 11 result in nine characters being decoded at the nine LEDs of FIG. 4 and as described more fully below. This triggering of the start-stop circuit 11, which being a bucket brigade type, operates to produce a sequential cycle of enabling pulses to a gating circuit 12.

In the gating circuit 12 when the output from the start-stop circuit 11 is high, the gating circuit under the signal of this high transmits an output pulse to a switch 13 and energizing switch 13 powers the clock 15 to produce a pulse.

Figure 4:
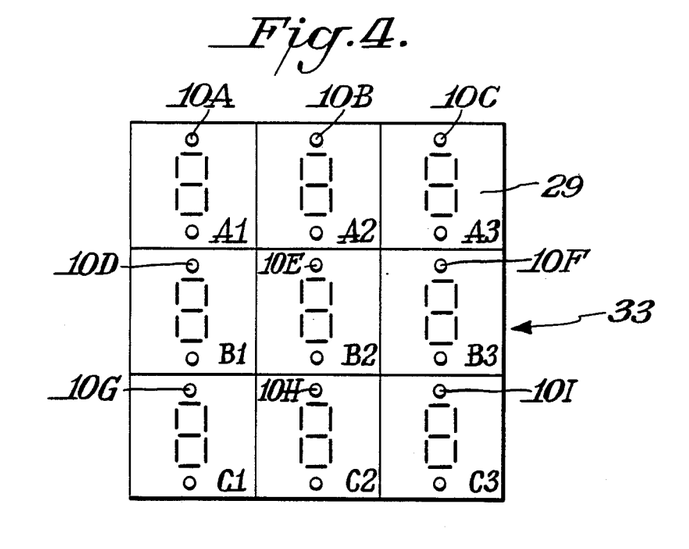
FIG. 4 is a representative keyboard and display panel according to an embodiment of this invention showing representative characters.

Referring to FIG. 1, the clock 15 provides a train of pulses to switch 13. As explained in greater detail below this is under the control of a circuit 11 and the operation of a voltage level provided by a high potential from this circuit 11 through the gating circuit 12 and switch 13 to clock 15. Each pulse to the counter 16 results in the display of a character on a light emitting diode. A matrix 33 of LED's 30A–30I is illustrated in FIG. 4. The matrix 33 and its LED's 30A–I are represented in FIG. 1 by a block diagram and the buttons 10A–I are similarly diagrammatically represented.

Figure 2:
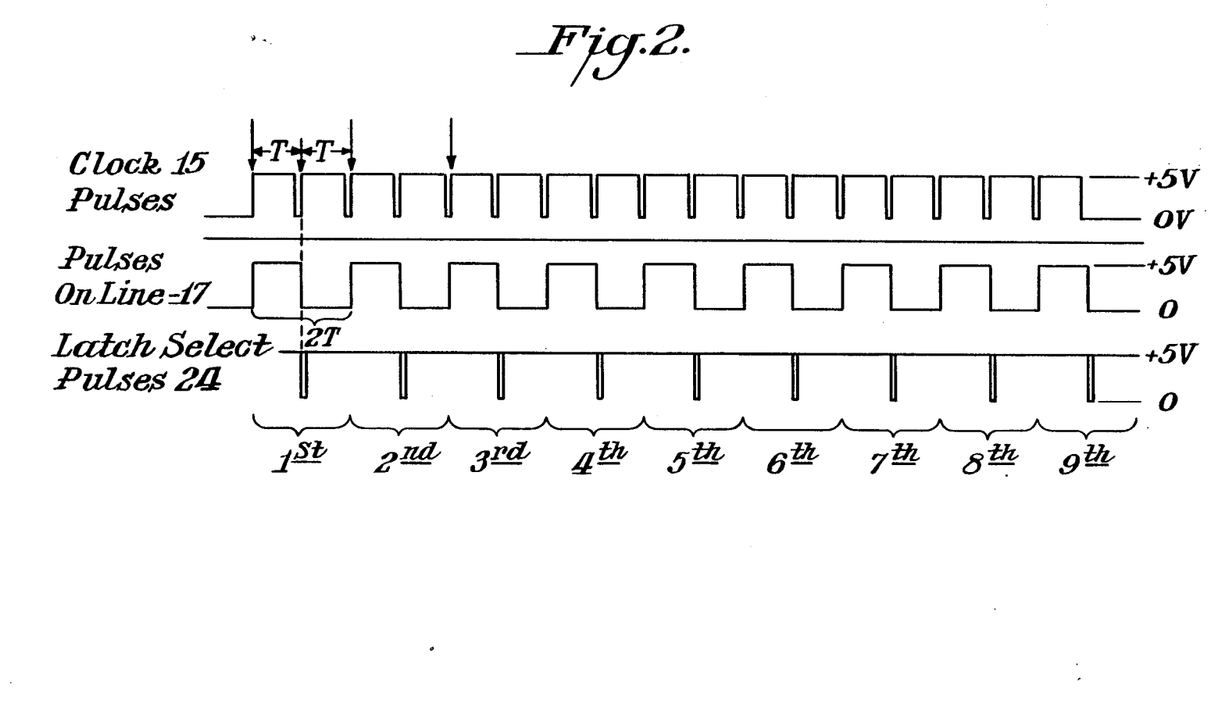
FIG. 2 is a timing diagram of typical signals.

The matrix 33 and its LED's 30A–30I are an integral part of the means for accessing through the cryptography technique which is an object of this invention as mentioned above. During the period of the enabling pulse from circuit 11 the start/stop 11 produces a pulse transmitted to the counter 16 on line 17. Referring to FIG. 2 this is a graph of the pulses in the nine time intervals which occur upon actuation triggered by one operation of one of the buttons 10A–I. It will be readily understood that the nine time intervals are related to be coincidental with the nine figures appearing in the LEDs 30A–30I as alphanumeric characters. The nine time intervals make up a display cycle and each operation of one of the buttons 10A–I, is followed by a display cycle of nine time intervals and nine displays. With the actuation of a reset button and the triggering of the display cycle of time intervals in the consequent cycle, the first and enabling pulse initiates the first time interval and the first clock pulse to the counter 16.

The pulse from 10A–I is delivered to a timing circuit 18 on line 19. The delay timing circuit 18 issues a pulse to the start-stop circuit on line 22. The timing circuit 18 operates a delay factor in issuing pulse to a data select 20 on line 21.

The delay pulse from timing circuit 18 to data select 20 starts a counting operation within data select 20 which sends a latch select signal over a latch select bus 24 to one of the latches 25A-25I.

FIG. 2 is a timing diagram showing in the uppermost graph the relative timing of the pulses from the clock 15, in the middle graph the pulses from the circuit 18 on line 17 and in the lower graph the pulses from the data select 20 on bus 24 and the braces delineating time intervals in which they occur. The relationship of these pulses to the transmittal of the code characters is explained below.

Figure 3:
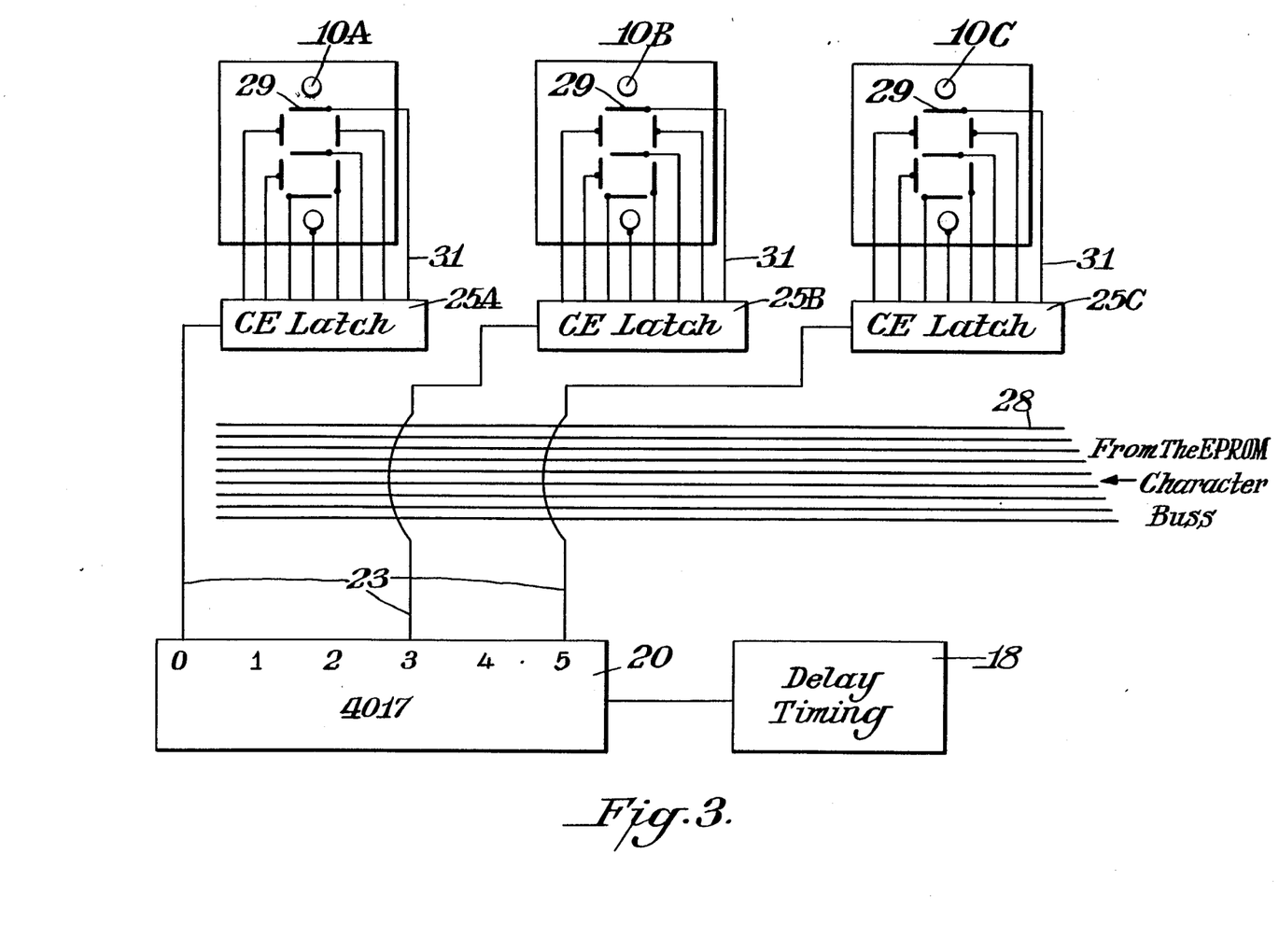
FIG. 3 is a detail schematic diagram showing the means for control of the latch select commands.

First, reference is made to the data select 20 which has 9 pins (not shown). The latch select bus 24 is made up of nine latch select lines 23A-I as illustrated in FIG. 3. All of these lines 23A-I are connected to the latches 25A-I from data select 20. As shown in the detail of latch select circuits in FIG. 3, a latch select line 23A connects latch select pin 0 of counter 20 with latch 25A. The match up of latch select pins 0-8, of the data select latch select lines 23A-F and latches 25A-I is as follows:

| Latch Select | Latch Select Line | Latch |
|---|---|---|
| 0 | 23A | 25A |
| 1 | 23B | 25B |
| 2 | 23C | 25C |
| 3 | 23D | 25D |
| 4 | 23E | 25E |
| 5 | 23F | 25F |
| 6 | 23G | 25G |
| 7 | 23H | 25H |
| 8 | 23I | 25I |

Each enabling pulse to the data selector actuates in response an output pulse sequentially at one of the latch select pins 0-8. These are latch pulses. When the latch pulse of a select line is applied to one of the latches 25A-I the digital information at the location is read by the latch from the character data buss line 28.

The pulse from the pulse generating system is delivered to the counter 16 on line 17 thru the start/stop partial sum 11. The counter 16 provides an output in a time interval as illustrated in FIG. 2 in response to the pulse from the clock 15. Counter 16 has address lines 26 connected to a ROM 27 and the pulse transmitted to the counter 16 provides output pulse on the address lines 26 which are directed to a selected address in the ROM 27. Each time interval of FIG. 2 has two pulses from clock 15, and the address pulses are directly related to a time interval in which its clock pulse occurs.

Referring to the interelation of the pulses illustrated in FIG. 2, the nine time intervals are determined by the bucket brigade action from the start-stop circuit 11. The data select 20 when energized by receiving a high from one of the buttons of the set of buttons 10A-I, progresses through this cycle of nine pulses and then shuts off.

To describe this cycling the relationship of the sequencing of the pulses of the trains of pulses is illustrated in FIG. 2. As mentioned above when depressing buttons 10A-I produces a pulse on line 19, a pulse is delivered to the delay timing circuit 18. This in turn produces first a timing pulse back to the start-stop circuit 11 and immediately subsequently a pulse on line 21 to the data select 20. The relationship in point of view of time of these pulses within each time interval is illustrated in FIG. 2.

Each of the nine time intervals, identified 1 thru 9 is initiated by the increase of potential in the form of the clock pulse from clock 15. The pulse on line 19 to timing circuit 18 in turn initiates the timing pulse and subsequently the latch select pulse, which in turn is initiated as the potential on line 22 decreases. The delay timing pulse generates nine consecutive positive square wave pulses which result in the pulsing of the succeeding time intervals. As can be seen the sequencing of pulses within each display cycle is repeated in the succession of nine time intervals of the cycling of the data select on each operation of one of the set of buttons 10A-I. The relationship of the timing within the sequences illustrated in FIG. 2 to the functioning of the accessing apparatus of this invention is described below.

The binary number from the counter 16 provides an address in the EPROM 27, which contains a binary CD which will be translated into character in accordance with the enciphered password. This is the encrypted password which authenticates the accessor and authorizes the access. This preselected address, not shown in FIG. 1, contains information for a symbol in accordance with prior programming of the ROM 27. It is an enciphered symbol in accordance with this invention.

Output pulses from the ROM 27 are passed through character lines 28 to the latches 25A-25I. The sequence of time intervals provided by the clock 15 pulses define time periods during which the characters are delivered to the latches 25A-25I and are directly related to cycle of enabling pulses of circuit 11.

Positive character pulses from the address in the ROM 27 are delivered on the character lines that make up the character data bus 28 to the latches 25A-I. The potential levels on the character lines read out of the ROM 27 address are positive pulses on digital "1" or the absence of a pulse or negative pulse digital "0". The latches 25A-I are circuits for storing information about the character which has been read out of the ROM 27 pursuant to the addressing from counter 16. The time interval of the pulse from clock 15 is directly related to the time interval of the writing of the character data bit into the latches.

The delay between the holding the information levels in the data bus line 28 from the ROM 27 and the latch select signal from the data select 20 permits the logic or 0 levels to be held in the data bus before the command is transmitted from counter 20 which latches the character data bits in the selected latch thus decoded by the hard wiring to its LED. The digital information in the latches 25A-I represents the preselected character of the preselected address. This preselection is the programming of ROM 27. Thus the digital information represents part of the enciphered password. The command from the data select 20 triggers the reading out of the held digital levels in the data bus 28 at the segment lines 31 to the segments 29.

Referring again to FIG. 3, from this it is readily seen that each character delivered from ROM 27 on the character lines 28 is latched in each latch 25A-I in the form of potential levels for powering segments 29 in the deciding readout. What is latched in the latches 25A-I is the digital output of the ROM 27 which is the programmed character from the ROM 27 in a digital output signal in "1"s or "0"s or levels.

The circuits of the latches 25A-I for storing the bits of the binary coded decimal character are bistable, having 2 digital outputs, referred to as digital 1 for a logic 1 level and digital 0 for a logic 0 level. Thus there is stored in the latches 25A-I digital 1's for segments 29 which are powered to display light and digital "0"s for segments 29 which are dark.

Each latch 25A-I is connected by the latch select bus from the timing circuit 18 through data select 20 and bus 24. The LED 30A-I which is energized in each cycle is selected by a command from the data select 20. The bit levels on the segment lines 31 to their respective segments 29 result in a decoded display of the character information on the segment 29 making up the selected LED 30A-I. The time interval of the train of pulses from clock 15 is directly related to reading out the decoded BCD's in the displayed characters.

Figure 10A:
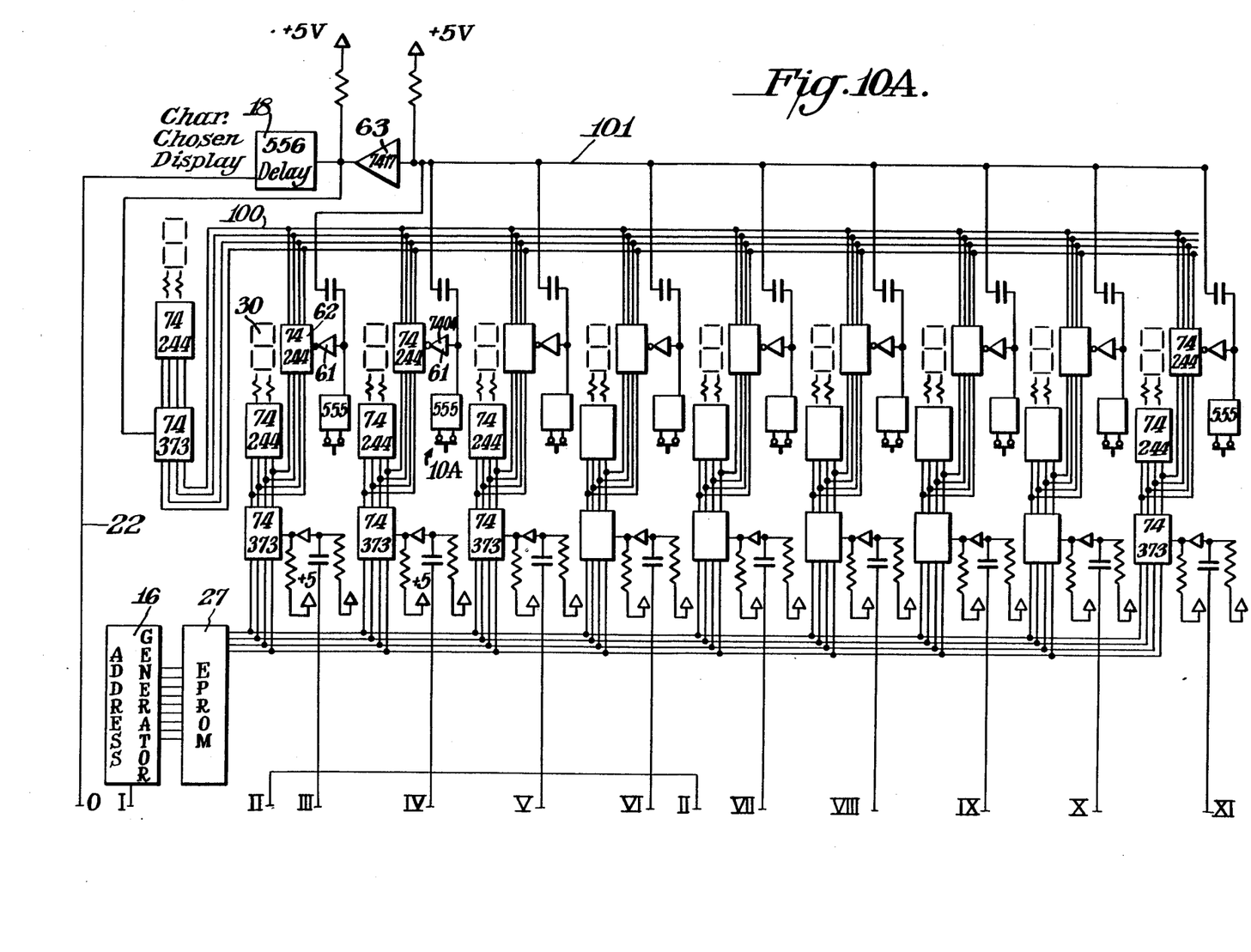
FIG. 10A and 10B are detailed schematic diagram of circuitry illustrating one embodiment of a cryptograph according to this invention.
Figure 10B:
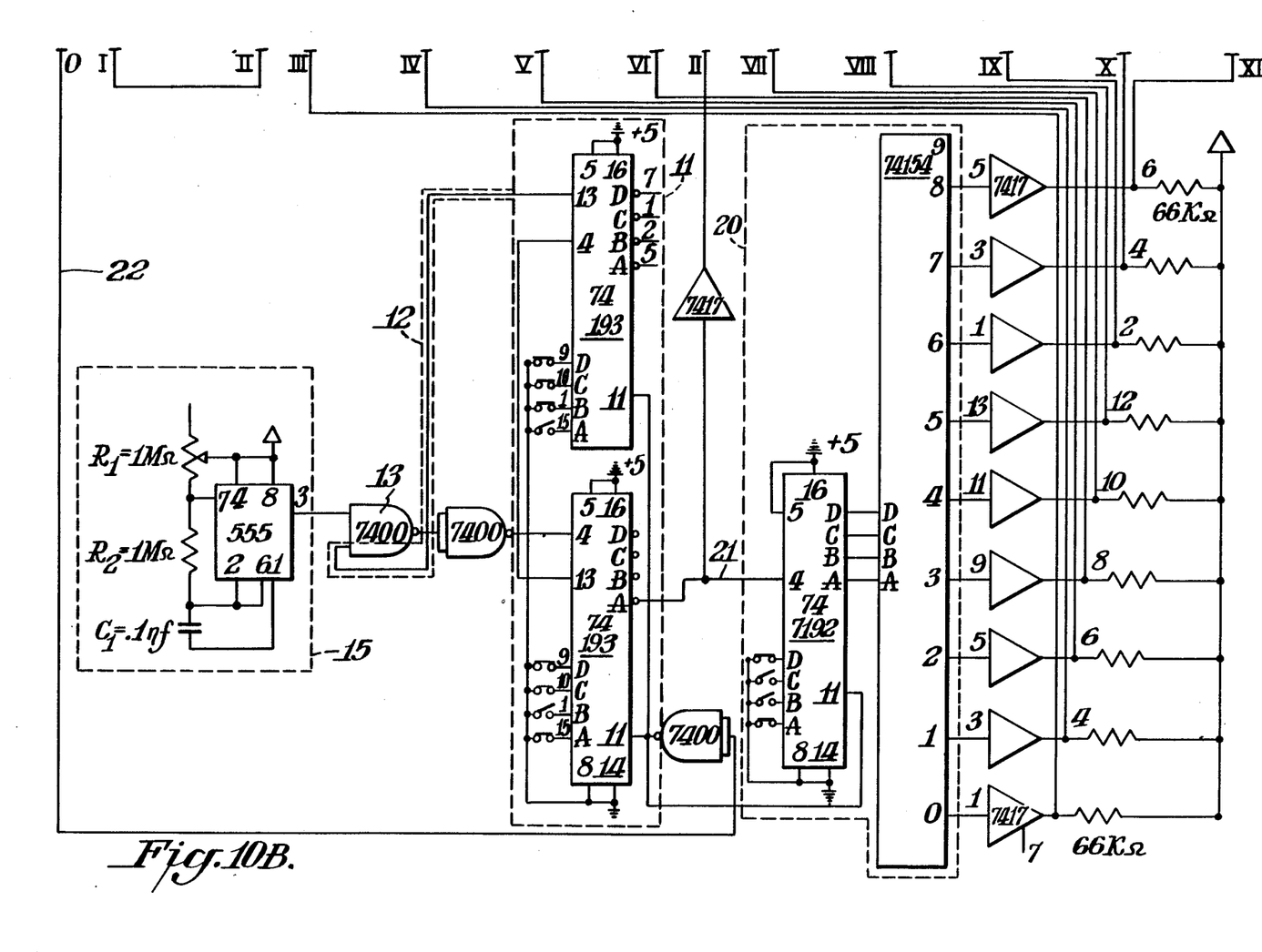

FIGS. 10A and 10B are a schematic diagram illustrating the embodiment. The heart of the pulse generator is a 555 configured in the astable mode, clock pulse generator 15. This device produces asymmetrical waves with a period given as $T=0.693 (R1+2R2)C1$. The wave train is directed to a NAND gate that serves in conjunction with an output from a 74192 gating circuit 12, as a switch designated as switch 13. The gating circuit 12 is formed by the output from a 74192 "borrow" pin to the input to a 7400 NAND gate designated as gating circuit 12. 74192 is a base 10 counter and 74193 is a base 16 counter.

The start/stop partial sum circuit 11 is constructed by cascading two 74193, and binary counters configured in the down mode. In the given configuration the counter subtracts one from the count on each positive pulse transition of the clock 15. This continues until a zero binary coded decimal is generated. When the zero is generated pin 13 of circuit 11 the "borrow" function goes low. This inhibits any further clock pulses from the astable configured clock 15 from reaching the trigger input (Pin 4) of the 74192 start/stop circuit 11. The resultant output from the counter 16 is a symmetrical square wave train of pulses with a period of approximately $T=1.386 (R+R2)C1$ where R1, R2, C1 are the resistors and capacitors of the configured clock 15.

The output from the counter 16 is transformed into a wave train by using the least significant digit of the binary coded decimal as follows. Selection of a character from the matrix 33 is accomplished by depressing a button 10A-I on the appropriate matrix character which produces a positive square wave which is inverted by the inversion gate of a hexinverter 61. This negative going pulse is applied to the control gate of the octal buffer 62, 74244 which deposits the byte character latched by the octal latch 25 on to the data buss 100 and displayed by the character chosen display.

The positive pulse is also applied through line 101 to the half monostable 63 made of a 7417 non inverting amplifier and the RC network which produces a negative pulse which serves as a trigger pulse for a 556 configured as a delayed pulse generator delay timing 18. The delay time 18 produces a positive pulse which is applied to the input of a 700 NAND gate A. This results in a negative pulse applied to load pin of both the 74192 counter in the start/stop 11 which loads the binary coded decimal located on pins A, B, C and D of the chip into the cascaded 74192 counters of start/stop 11, and of the data select 20. The number $18_{10}$ is loaded and with each clock pulse of one zero to 5V transition or level one is subtracted from the loaded 18.

FIG. 4 shows the representative matrix 33 for this invention, in which the buttons 10A-I and the seven segment LED's 30A-I are arranged in nine position array consisting of first, second and third rows which are explained in detail below. As explained above the logging in is effected by actuation of one of the buttons 10A-I. This starts logging in the password described above.

Each display LED 30A-I position in the matrix 33 is accompanied by one of the button switches 10A-I. The display LEDs 30A-I are energized individually upon the actuation of one of the button switches 10A-I. Hit one button and they all change position.

The latches 25A-I have stored the appropriate characters on the eight character lines in form of the binary coded decimal character from the EPROM 27 address in the form of digital potential levels. The binary coded decimal character data is decoded by being read out as either a "1" or a "0" and displayed on the segment 29. This read out occurs at that one of the latches 25A-I to which is transmitted the latch select pulse on the latch select pulse in the time interval.

It is a feature of this invention that the introduction of a signal at the matrix 33 results in a BCD read out from ROM 27 on the character lines 28.

It is a purpose of this invention to detect incorrect data in the password information. For example, the password information may be correct for identification and authentication for the actuation of the operation of a controlled device. Alphanumeric reference information is stored in the equipment in binary coded decimal bits and a alphanumeric coded information is put into the equipment for detection and processing.

The processing is carried out by means of two registers, data that is written into one register from an external source, that is the matrix 33 and data which is written into a companion register from a program of a microprocessor. An ultimate purpose is the comparison of the values as written into the registers for detection of incorrect data in the externally introduced data.

The data written into the equipment from the external source is processed through an input/output. The externally introduced data is in binary character form in the I/0 unit having been suitably introduced from the cryptograph described above.

Figure 5:
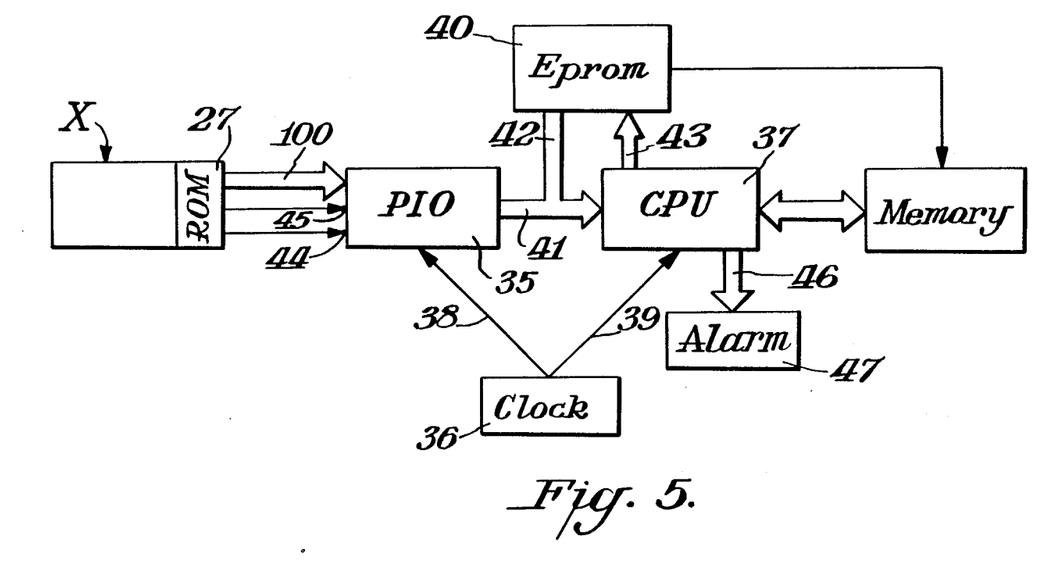
FIG. 5 illustrates an apparatus including the encryption device for comparison of values according to this invention.

FIG. 5 illustrates a detection apparatus in accordance with the invention. In FIG. 5 the cryptograph described above is identified by X. The apparatus is supplied with current from a low voltage source. The input data is introduced in binary character form from the ROM 27 of cryptograph X into an input/output 35 over character lines 100.

The operation begins with initializing the display and a clock 36 switching on the input/output 35 and a CPU 37 over lines 38 and 39 respectively. The matrix 33 and its associated circuits provide data. The CPU 37 is ready to start reading process data coming from the input/output 35.

The CPU 37 is looking for a character or a matrix coefficient. It looks for the matrix coefficient by looking for a change of character at a certain position at a certain time interval in the display cycle. The CPU 37 determines whether the input from the cryptograph X equals the character from the EPROM 40. There is equality when the binary coded decimals are equal and this results in authentication.

The CPU microprocessor 37 is then under the control of the program in the EPROM 40. Thus the operations of comparison and access control are performed under the instructions carried out pursuant to this program in EPROM 40. By way of explanation, the instructions for processing data consist of three cycles each. These can be characterized as the first cycle or fetch signal, sent on the address line 43 to the EPROM 40, which is followed by the read cycle in which are read and fed back thru line 42 for decoding in the CPU 37 followed by the third cycle of decoding in CPU 37 to lead to performance of the specific operation.

The instructed operation is performed in the microprocessor and the procedure of three cycles is repeated for each instructed operation.

As mentioned above, the purpose of the operations is to determine when the externally input data has provided the proper addressing of the information to authorize the access. This authorization occurs unit-by-unit.

In further explanation of the described embodiment, in the communication with the access system instituted by the externally input data, the first step is communication with the input/output 35 from the character buss 28. This sets the operation mode and the register sets which will be used as the above-mentioned register.

The sequence then provides a time delay referred to as half and the timing by the clock 36 of the interrupt as referred to above. This halt and interrupt sequence occurs with each introduced binary coded characters from the ROM 27 on the buss 28. As several symbols are used to make up the particular password, the initiating of the operating mode, the halt, interrupt, and restart will be repeated for each of the several cycles.

After the restart in each repeated symbol process an ARDY pin in the input/output 35 is set to signal readings for the input of the externally introduced data into the register A of the CPU 37 over line 41 for transmission. Reading the input causes the ARDY pin 45 to go high or positive and whatever binary coded data is in the input/output 35 is moved into the A register of the CPU 37.

After the data is moved to the CPU 37, the ASTB pin 44 goes low, the ARDY pin 45 goes low and the input/output is ready for reception of more character data.

By way of further detailed explanation of the procedure, at the ROM 27 the character is introduced in binary code.

The binary coded data of the symbol is introduced at the A port of CPU 37 and an instruction indicates that the character data is waiting at the input for the A register of the CPU 37. A low for a short interval (2 microseconds) and the character data is taken into the input/output 35. Then the procedure described above again takes place for this succeeding character, in that the input/output 35 responds by loading this binary coded data onto the input of the CPU 37.

The CPU 37 then reacts and reads the data from the input/output 35 into the CPU 37 A register. Then the programmed instruction loads the reference integers from the EPROM 40 which is the relevant value into the B register of the CPU 37.

Thus the A register content is whatever was introduced externally from the ROM 27.

The B register has the content of the value loaded by the program from the EPROM 40. The value is loaded by the three cycles described above.

After the values are entered a comparison of the values is made by subtraction. The binary subtraction results in a binary 0, if a match of values is indicated the system goes to halt and is in condition for receipt of the next entry from the keyboard with its interrupt.

On the other hand, if the match in values results in a setting to decimal 1 of the flag register in the CPU 37, an alarm signal is sent on line 46 to an alarm 47. Thus, if the numbers are equal a 0 is set in the Z register, if no 0 then at 1 set in the Z register.

It is the purpose of this invention to deliver from the cryptograph X to the A register alphanumeric characters as 8-digit binary coded decimals and by this delivery to the A register effect a comparison values by the match of values described above. AT the same time the operation of the cryptograph X includes a display of characters which simultaneously disguises the proper code and participates in the operation of the accessing procedure. Not only does the present invention provide a match of values for letters and integers but also of matrix coefficients. The coefficient is matched by having a position in the EPROM 40 which is the coordinate position of the binary coded decimal within the password string.

Figure 6:
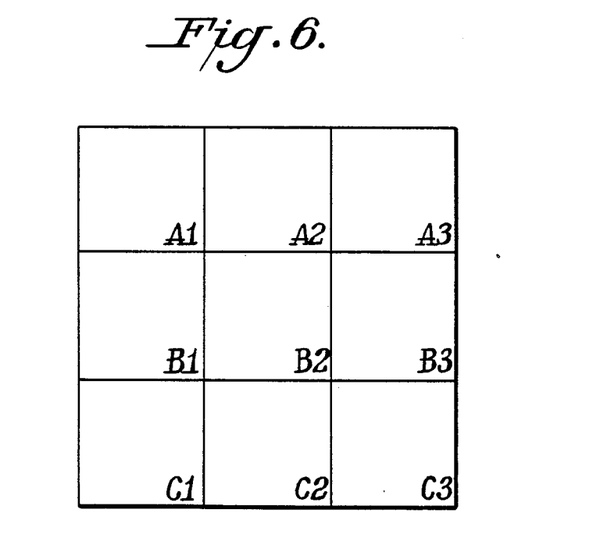
FIG. 6 is a table identifying the matrix of positions on the keyboard.
Figure 7:
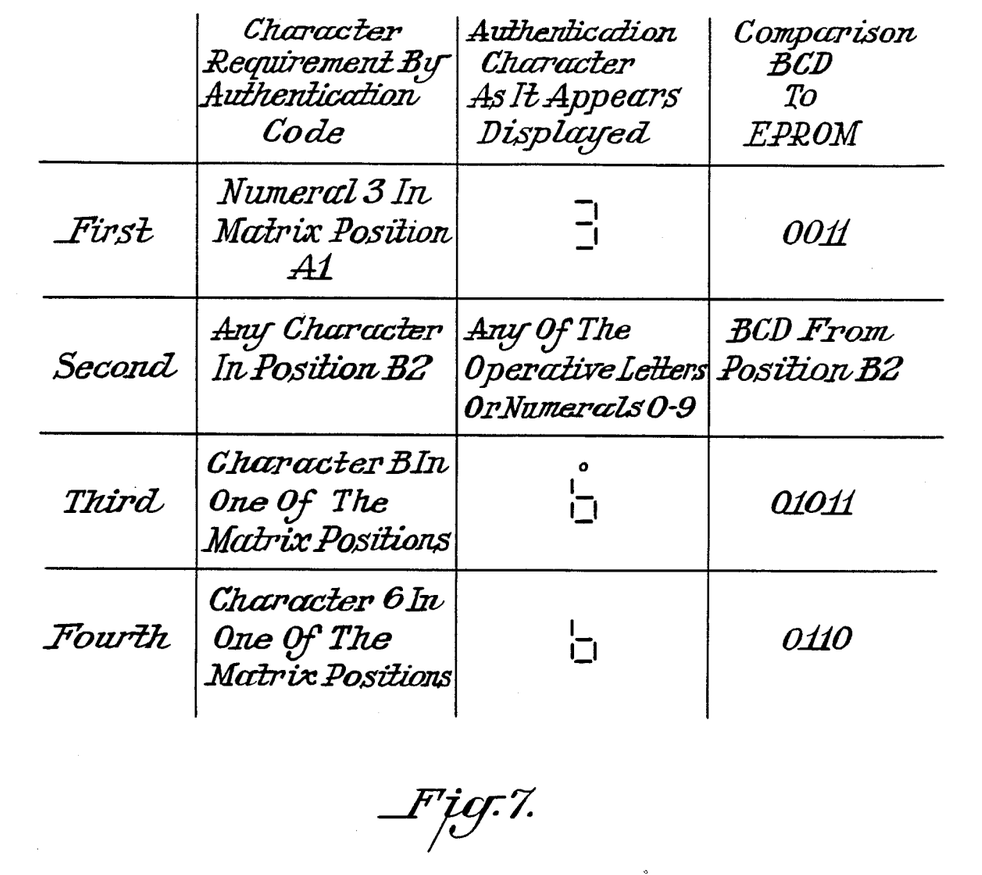
FIG. 7 is a table of the alphanumeric characters of the present cryptographing system.
Figure 8:
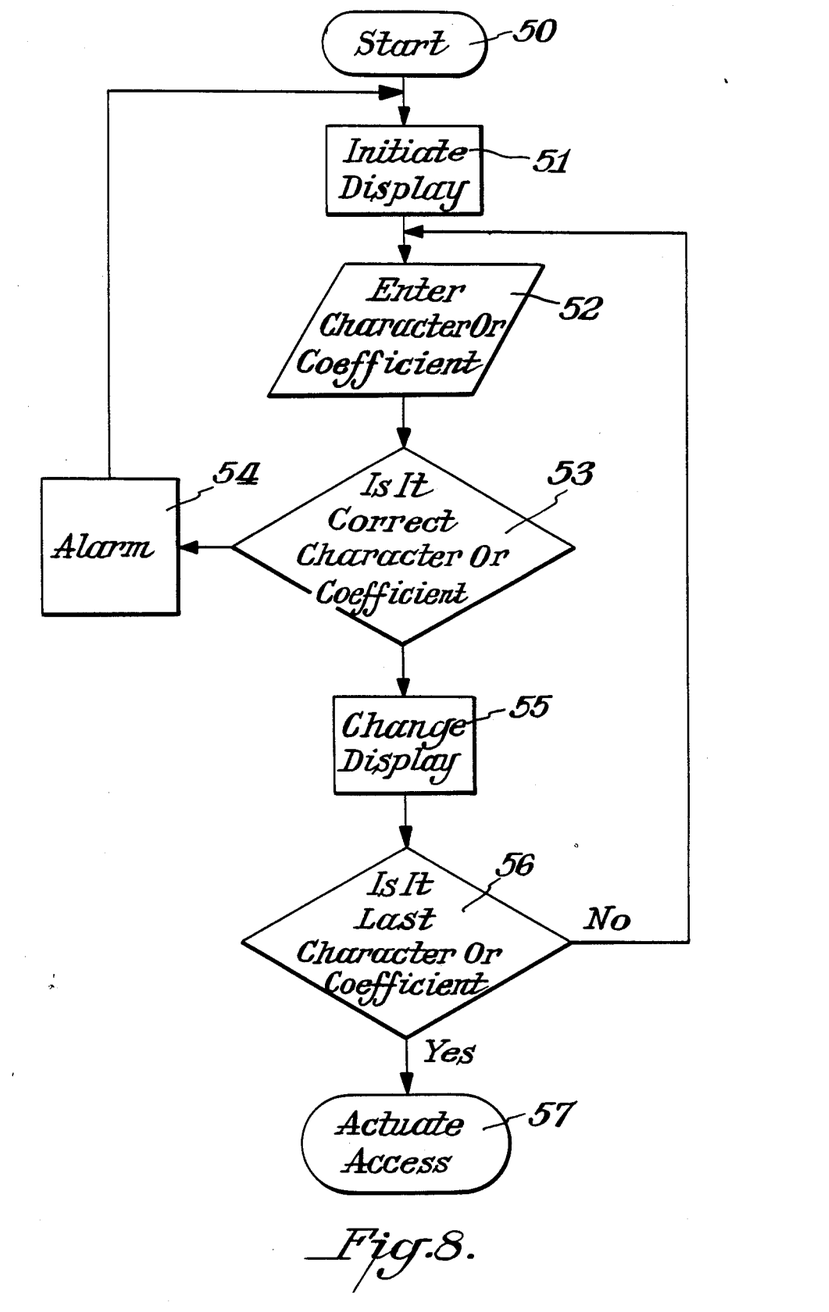
FIG. 8 is a flow chart detailing the operation of the system.

In description of this aspect of the present invention particular reference is made FIGS. 6, 7 and 8.

FIG. 6 shows a table which illustrates the matrix 33 of the keyboard. This matrix 33 is made up of three rows and three columns providing nine array positions, as Row 1—positions A1, A2, and A3; Row 2—positions B1, B2 and B3; and Row 3—positions C1, C2 and C3. The operations which produce lighted LED's in these nine array positions are described above.

It will be understood that the characters are transmitted to the A register in the form of these binary coded decimals. The object of the system is to submit in the respective actuation of the sequence of actuations a proper symbol to the A register. The rationale of the procedure being that the proper symbol will result in a match of values which promotes the accessing procedure and finally authorizes access.

The password combines both alphanumeric characters and matrix coefficients as elements of the password. It is a feature of the present invention that the externally input data provided to the input/output 35 for a match of values in register A is composed both of binary coded decimals representing a particular alphanumeric character in a given actuation interval, but also a matrix coefficient resulting from an actuation at a particular array position. It can be seen that this combination of symbols provides a tremendous number of combinations of the elements to comprise the password on a single system.

For example, part of a relatively short access code may consist of four elements in four successive actuations and selected from all three categories, namely in the following sequence.

| First Actuation | The numeral 3 in position A1 |
| --- | --- |
| Second Actuation | Actuate position at B2 any character |
| Third Actuation | The letter b in any position it appears |
| Fourth Actuation | Numeral 6 in any position it appears |

Thus whatever numeral or letter the access code program provides in the second actuation is meaningless as the password data consists of the matrix coefficient in that step. However, to the contrary in the third and fourth actuation steps, it is character, not the matrix coefficient that constitutes the character data.

Each of the actuations produces nine characters displayed on the matrix 33. Each of these characters represents an alphanumeric character defined by bits. AT the same time the actuation puts into the I/0 the true access code data, if the accessor has operated the proper button 10A-I. This data may be a BCD representing an alphanumeric character as illustrated in FIG. 7 or a BCD from a particular array position. For a specified use there is stored in the CPU the expected data. The data is transmitted in bits forming the BCD's.

FIG. 7 is a table illustrating the relationships in the respective actuation steps in the operation of the four element access code referred to above.

Leftmost column—the four sequential actuation steps.

Next leftmost column—the data of the proper code required to be delivered to Register A.

Next column—the lighted LED displaying the authenticating data of the proper code.

Rightmost column the 8-digit binary coded decimals.

As another example, consider a two password system such that the first is P(1)=K11, E J K22 P C K13 G and P(2)=L 7A K22 U Y K13 F.

The initial display presented to the keyboard matrix is:

(L C G) AS OBSERVED THE "K11" element is
(A H O) a part of both passwords. This indicates
(T Y I) to the microprocessor that as long as the character "L" is received, either of the two passwords may be valid. The user now depresses the button over the "L" and the microprocessor receives an "L". Since this is both a valid character and entity the display is changed to:
(R N O) At this point a differentiation between
(7 6 5) the two passwords can be made.
(Z E I)

The operational sequence of the process is illustrated by the flow sheet in FIG. 8. The initiation of the operation, as represented by oval 50, is effected by actuating the button 32. This is an actuation of the keyboard. Characters are read form EPROM 27, and appear in the described embodiment on the LEDs 30A-I. This is a function indicated diagrammatically in FIG. 8 by block 51. The circuitry is now prepared for the entry of the password to identify the user. The first symbol of the password is entered as represented in the flow chart of FIG. 8 by parallelogram 52.

This actuation of the appropriate matrix coefficient and/or character by the user leads to the determination by the CPU 37 whether the actuation of characters or coefficient on the matrix at a specified time interval in the display cycle is the appropriate actuation in that display cycle. This decision point is represented by the diamond 53. The determination is made by procedures described herein relative to the operation of the CPU 37 loading the integers into the A and B registers and the carrying out the 3 cycles.

The negative branch of diamond 53 carries the process to notification of an unsuccessful log-in attempt represented by the block 55 and the actuation of a signal, such as an alarm. This function is represented by the block 54. The negative branch also carries the process back to the initial display on the matrix 33 as represented by block 51.

The affirmative branch of diamond 53 carries the process to the block 55. The character displayed on the LEDs 30A-I of matrix 33 are changed by characters read from EPROM 27 as represented by block 55.

The program now proceeds to determining whether the authenticated password symbol is the last number of the password string. This is represented by the diamond 56. The negative branch carries the program back to entering the next symbol. The affirmative branch carries the program to actuating access represented by the oval 57.

The following is a narrative example of how a program could be made so as to differentiate among stored passwords and select the correct one composed of symbols made up of characters and matrix coefficients.

The length of the password is symbolized by the integer "N". The process begins with the first symbol generated by the buttons 10A-I.

The difference between an alphanumeric character and a matrix coefficient is that the latter is the matrix position of the indicia and associated button, the location of which is in the EPROM.

Figure 9A:
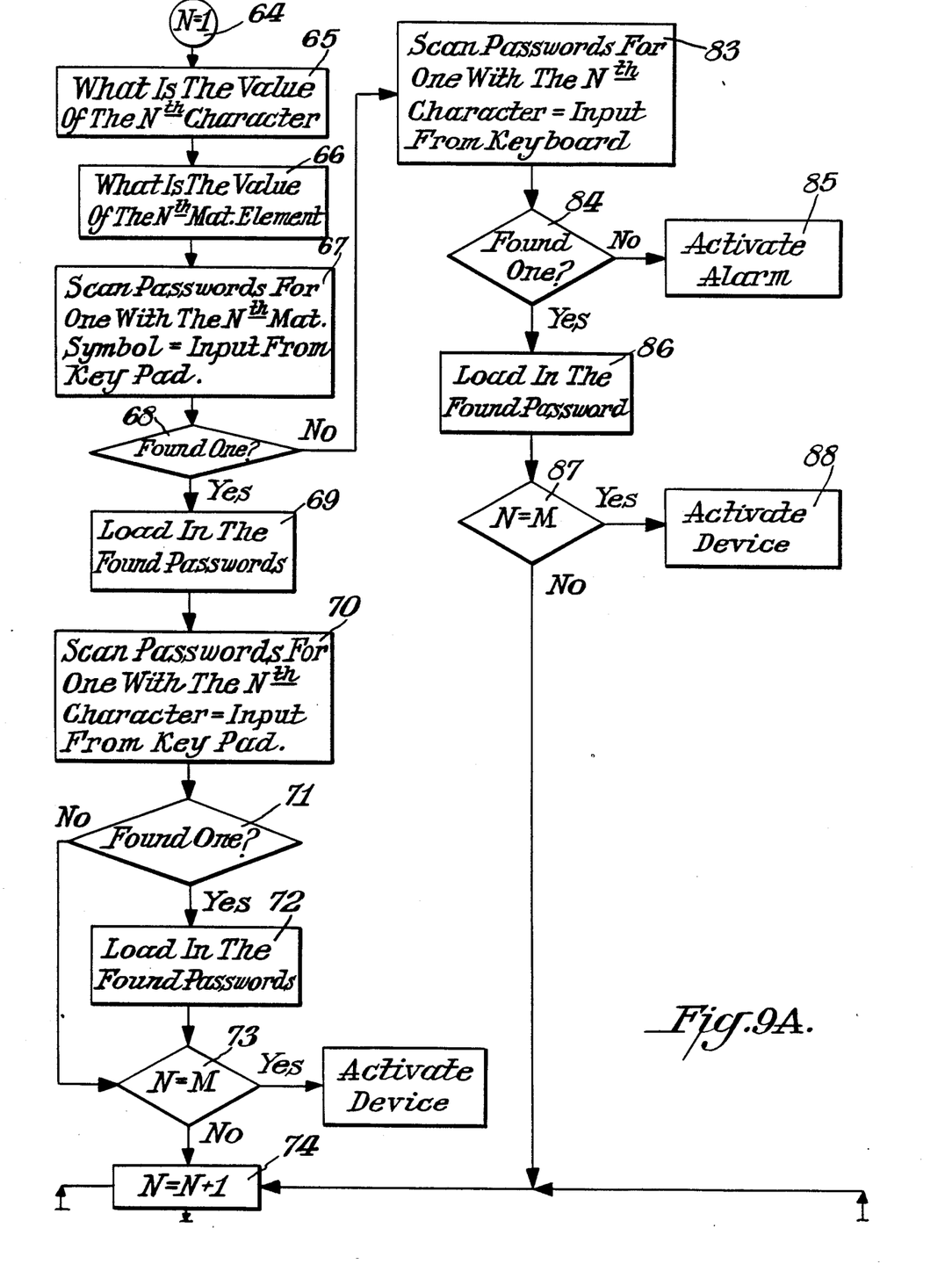
FIGS. 9A and 9B are charts of a representative operation.

A particular configuration consisting of both numeric and alpha characters are displayed on the display matrix. A character is selected by depressing the appropriate button 10A-I, represented by circle 64 in FIG. 9A. This sends a byte which is the first character. The corresponding matrix coefficient is known by programming in the EPROM. Because of the programming of the EPROM, the reception of the given character also indicates the matrix position of that symbol in the particular display. Referring to FIG. 9A, this is what takes place in 65 and 66 in the diagram. The memory is then searched for the appearance of the indicated matrix coefficient in 67. In 68 the outcome of the search is examined. If no such symbol is found, a search for a character equal to the one received is conducted in 83. If no such character is found at 84, the alarm is sounded, as in 85. If a character is found then that entire password is loaded into a register as indicated by 86. The length of the password is checked in 87. If the length is correct the device is activated as indicated in block 88.

If the length is not correct then "N" is incremented by one. Going back to 68, if a symbol equal to the one received from the matrix 33 was found then that particular password is loaded into a particular register, as in 69. The memory is now searched for a character equal to the first input from the keyboard, as in 70. If one is found it is loaded into the found passwords as in 72. If no other is found in decision block 71 the length is checked at 73. If the length is not the correct one it is incremented by one, as in 74.

Figure 9B:
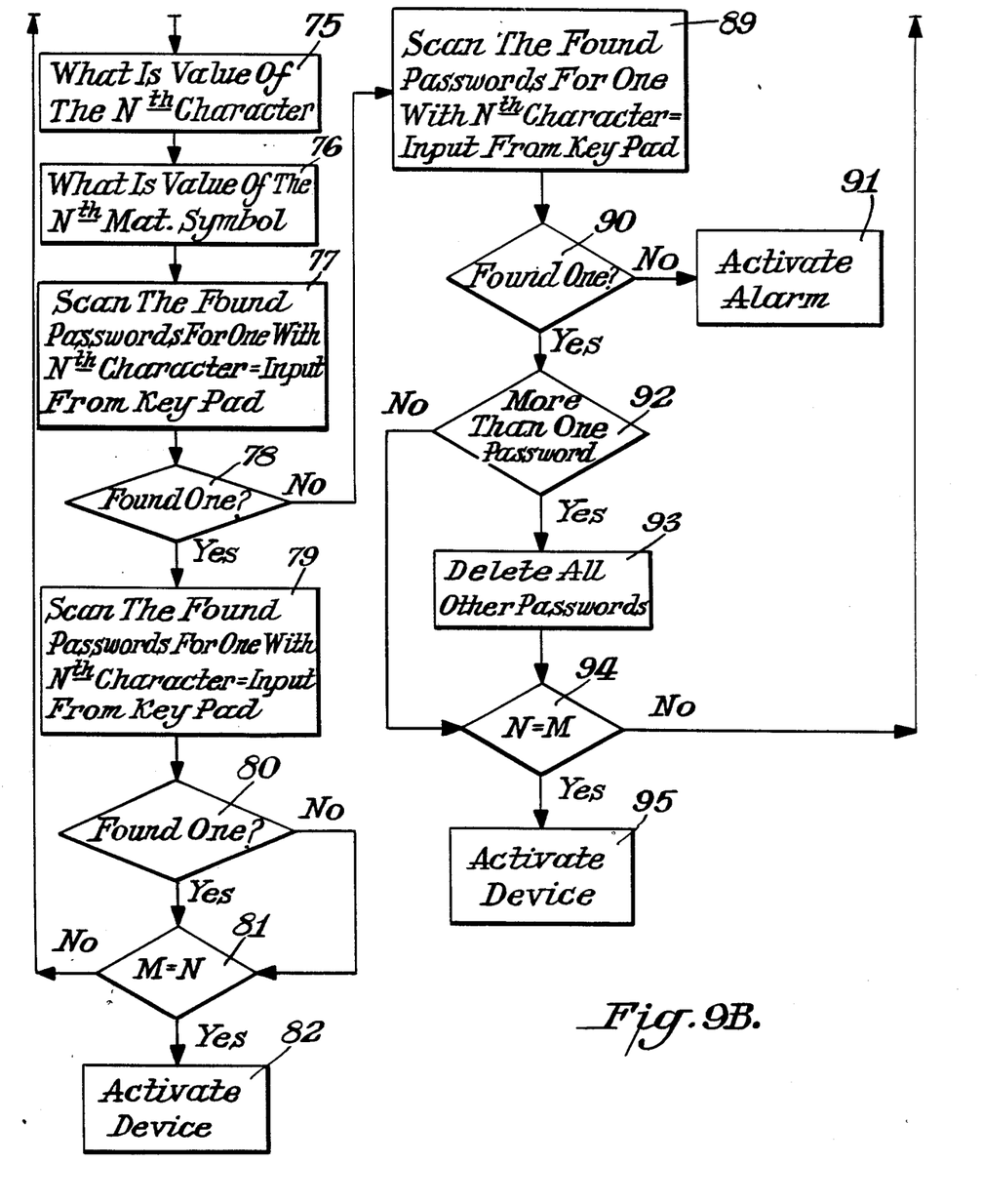

Referring to FIG. 9B the central processing unit (CPU) 37 now waits for the second character from the keyboard as in 75. The reception of a character makes it possible to find the associated symbol as in 76. The found passwords are searched in 77 for the one in which the second symbol is equal to the input from the matrix. If one such password is found at 78 then the found passwords are searched for one whose second character equals the one from the matrix 33, as in 79. If one such password is found at 80 then the length of the password is checked at 81. If no such password is found at 80 the length is still checked at 81. If the length is correct then the device is activated at 82. If the length is not the correct one then the length is incremented at 74 and the CPU will wait at 75 for the next character.

Returning to 78, if no appropriate matrix symbol is found at 77, then the passwords are checked for the second character as in 89. If no such password is found at 84 then the alarm is activated at 91. If the search is successful at 89, then the other passwords are deleted at 93, and the length is checked at 94. If the length is correct then the device is activated. If the length is not correct at 94 or if only one password is found at 92 the length "N" is incremented at 74 and the CPU will wait at 75 for the next input from the matrix 33.

I claim:

1. A security apparatus for identification of a preselected code of characters by a predetermined cryptogram of symbols comprising in combination a matrix consisting of an arrangement of a plurality of locations having selectively operable manual switches and variable visible indicia associated with said switches, said indicia operative to display letters and numerals at said locations, said switches being sequentially actuatable with a sequence of values representing a preselected code of symbols consisting of alphanumeric characters and matrix coefficients, a matrix coefficient consisting of a value represented by a visible indicia at a selected location at a selected sequence in said preselected code, a first memory containing a configuration of alphanumeric characters and matrix coefficients for display on said variable visible indicia, a predetermined program of a preselected code of symbols consisting of alphanumeric characters in binary coded decimals and matrix coefficient in said first memory having potential levels at addresses, means for providing pulses to said addresses in said first memory upon the operation of a switch means for transmitting the potential levels of said binary coded decimals from said first memory to said plurality of latches, means for storing said binary coded decimals in said latches whereby each transmitted binary coded decimal is stored in a latch, means upon operation of said switch for generating a pulse to a delay timing circuit, means for transmitting a delayed signal from said delay timing circuit to produce a timed sequence of signals selected to be transmitted to said selected latches subsequent to the storage of the binary coded decimals in said latches, transmitting the stored binary decimals in each of said latches to a decoding circuit and to a sending circuit, means associated with said first memory for displaying on said variable visible indicia upon actuation of said switches of a plurality of said symbols including at least one alphanumeric character and at least one matrix coefficient in said actuated code of symbols, means electrically connecting one of said manual switches to said sending circuit for providing a signal to said sending circuit upon operation of said manual switch, means for depositing the binary coded decimal from said sending circuit on an electrical connection to a microprocessor upon transmission of said signal from said manual switch, said microprocessor having a second memory accessed by the microprocessor, said microprocessor being operative for executing a program stored in said second memory, means for storing in said second memory at least one access code of a preselected code of symbols consisting of at least one alphanumeric character and at least one matrix coefficient, operative to sequentially enter to said microprocessor pulses defining said actuated code of symbols, said microprocessor having means for comparing the binary coded decimal produced by the operation of the sending circuit with the stored access code, and means providing a signal when the transmitted binary coded decimal is not equal the stored access code.

2. The security apparatus as claimed in claim 1 wherein the variable visible indicia are light emitting diodes.

3. The security apparatus as claimed in claim 1, wherein the matrix is arranged in rows and columns.

4. The security apparatus as claimed in claim 1 wherein the matrix is a keyboard and the switches are keys of the keyboard.

5. The security apparatus as claimed in claim 1 wherein the means for displaying the symbols on the variable visible indicia is comprised of latches having means for receiving signals from the switches and lines connecting the latches to the variable visible indicia.

6. A security apparatus for identification of a preselected code of characters by a predetermined cryptogram of symbols:

comprising in combination a plurality of latches, a predetermined program of a preselected code of symbols consisting of alphanumeric characters in binary coded decimals and matrix coefficient in a first memory having potential levels at addresses, selectively operable switches, means for providing pulses to said addresses in said first memory, upon the operation of a switch, means for transmitting the potential levels of said binary coded decimals from said first memory to said plurality of latches, means for storing said binary coded decimals in said latches whereby each transmitted binary coded decimal is stored in a latch, means upon said operation of said switch for generating a pulse to a delay timing circuit, means for transmitting a delayed signal from said delay timing circuit to produce a timed sequence of signals selected to be transmitted to said selected latches subsequent to the storage of the binary coded decimals in said latches, means for transmitting the stored binary decimals in each of said latches to a decoding circuit and to a sending circuit, means for decoding the stored binary coded decimals in the decoding circuit to read out the potential levels to segments of a light emitting diode, means electrically connecting one of said selectively operable switches to said sending circuit for providing a signal to said sending circuit upon operation of said switch.

means for depositing the binary coded decimal from said sending circuit on an electrical connection to a microprocessor upon transmission of said signal from said switch, said microprocessor having a second memory accessed by the microprocessor, said microprocessor being operative for executing a program stored in said second memory, means for storing in said second memory at least one access code of a preselected code of symbols consisting of at least one alpha-numeric character and at least one matrix coefficient, operative to sequentially enter to said microprocessor pulses defining said actuated code of symbols, said microprocessor having means for comparing the binary coded decimal produced by the operation of the sending circuit with the stored access code, and means providing a signal when the transmitted binary coded decimal is not equal the stored access code.

7. A security apparatus as claimed in claim 6 wherein said sending circuit comprises a buffer circuit.

8. A security apparatus as claimed in claim 6 wherein said selectively operable switches comprises keys of a keyboard.

9. The method of identifying a predetermined cryptogram of symbols comprising the steps of:

providing a predetermined program of a preselected code of symbols consisting of alphanumeric characters in binary coded decimals and matrix coefficient in a first memory having potential levels at addresses, providing selectively operable switches, providing pulses from said switches to said addresses in said first memory, transmitting the potential levels of said binary coded decimals from said first memory to a plurality of latches, to provide potential levels in selected latches, storing said binary coded decimals in said latches whereby each transmitted binary coded decimal is stored in a latch, generating a pulse to a delay timing circuit upon the operation of a switch, transmitting a delayed signal from said delay timing circuit to produce a timed sequence of signals selected to be transmitted to said selected latches subsequent to the storage of the binary coded decimals in said latches, transmitting the stored binary coded decimals in each of said latches to a decoding circuit and to a circuit for sending the binary coded decimals to a microprocessor, decoding the stored binary coded decimals in the decoding circuit to read out the potential levels to segments of a light emitting diode, operating one of the switches to electrically connect said switch to said sending circuit for transmitting a signal to said sending circuit upon operation of said switch, depositing the binary coded decimal stored in said sending circuit on an electrical connection to a microprocessor upon transmission of said signal from said switch, operating said microprocessor operative for executing a program stored in a second memory, storing in said second memory at least one access code of a preselected code of symbols consisting of at least one alphanumeric character and at least one matrix coefficient, sequentially entering to said microprocessor pulses defining said actuated code of symbols, comparing in the microprocessor the binary coded decimal produced by the operation of the sending circuit, and providing a signal when the transmitted binary coded decimal is not equal the stored access code.

10. The method of identification as claimed in claim 9 wherein said sending circuit is a buffer circuit.

11. The method of identification as claimed in claim 9 wherein said switches comprise keys of a keyboard.

* * * * *